United States Patent [19]

Johnstone

[11] Patent Number: 4,735,639

[45] Date of Patent: Apr. 5, 1988

[54] MODULAR INDUSTRIAL VACUUM LOADING APPARATUS FOR INGESTING AND COLLECTING DEBRIS AND FILTERING DISCHARGED AIR

[75] Inventor: Duncan Johnstone, Lannon, Wis.

[73] Assignee: Vacuum America Corporation, Lannon, Wis.

[21] Appl. No.: 872,164

[22] Filed: Jun. 9, 1986

[51] Int. Cl.⁴ .................... B01D 46/04; B01D 50/00
[52] U.S. Cl. ................................. 55/302; 55/315; 55/429; 55/468; 55/DIG. 3
[58] Field of Search ................ 55/302, 315, 341 PC, 55/341 H, 343, 467, 468, 429, DIG. 3, 341 M

[56] References Cited

U.S. PATENT DOCUMENTS

| | | | |
|---|---|---|---|
| 3,356,215 | 12/1967 | Miles | 55/302 X |
| 3,490,208 | 1/1970 | Meyer et al. | 55/315 X |
| 3,618,297 | 11/1971 | Hamrick | 55/DIG. 3 X |
| 3,653,190 | 4/1972 | Lee et al. | 55/302 |
| 3,842,461 | 10/1974 | Wurster | 55/467 X |
| 3,951,623 | 4/1976 | Furstenberg | 55/302 X |
| 4,133,658 | 1/1979 | Callewyn | 55/315 |
| 4,285,704 | 8/1981 | Zuzanov et al. | 55/429 X |
| 4,581,050 | 4/1986 | Krantz | 55/429 X |

*Primary Examiner*—Charles Hart
*Attorney, Agent, or Firm*—James E. Nilles; Thomas F. Kirby

[57] ABSTRACT

Vacuum loading apparatus is provided for ingesting a mixture of debris (such as particulate matter) and ambient air, for collecting the debris for disposal, and for filtering the ingested air before discharging it to atmosphere. The apparatus comprises three relatively lightweight, portable, independently movable modules, each incorporating a weeled chassis, to facilitate their movement to, from and on the jobsite, whereat they are interconnected for use by large flexible hoses. The power module comprises a motor-driven vacuum blower. The debris-receiver module comprises a receiver tank with a removable disposable debris-collection bag therein (which bag may or may not have an associated filter) and a debris-collection vacuum hose connected to the exterior thereof. The upper and lower ends of the receiver tank and the inside and outside of the bag are exposed to the same negative air pressure in the tank to prevent its collapse or damage by a pressure equalization duct. The filtration module, which is connected between the vacuum pump and the receiver tank by flexible hoses, comprises two filter tanks, each having a filter assembly therein, and further comprises selector valves which are operable to enable use of either or both filter tanks during normal vacuuming and also to enable purging either one of the filter tanks so that accumulated filtrate therein can be fed back to the debris-collection bag in the receiver tank.

21 Claims, 6 Drawing Sheets

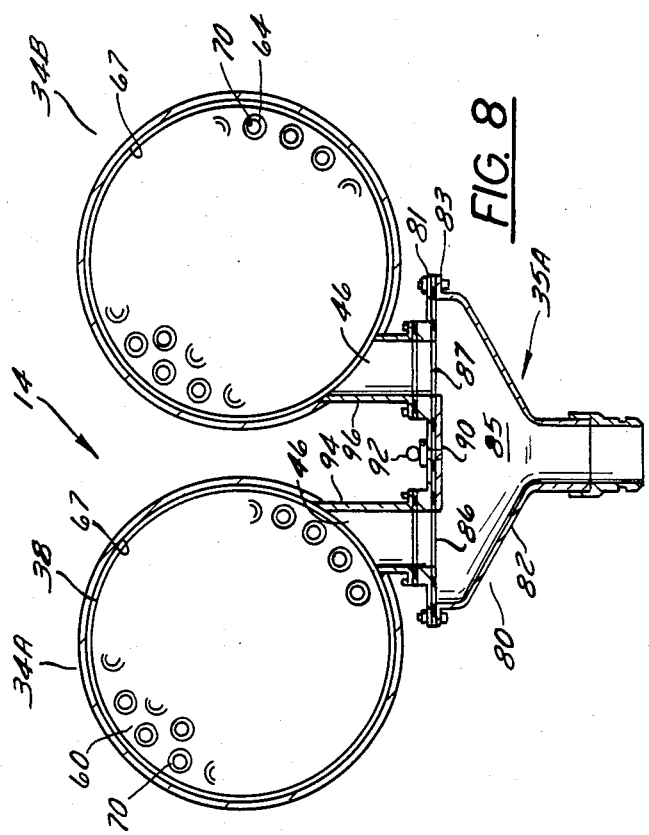
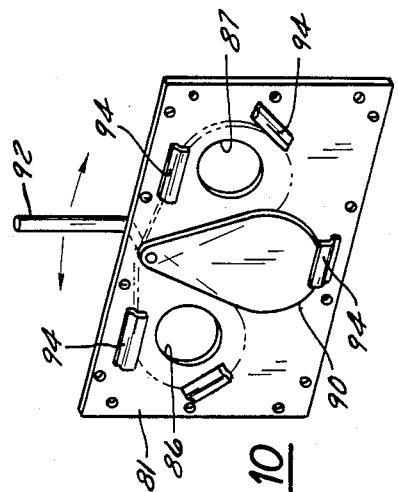
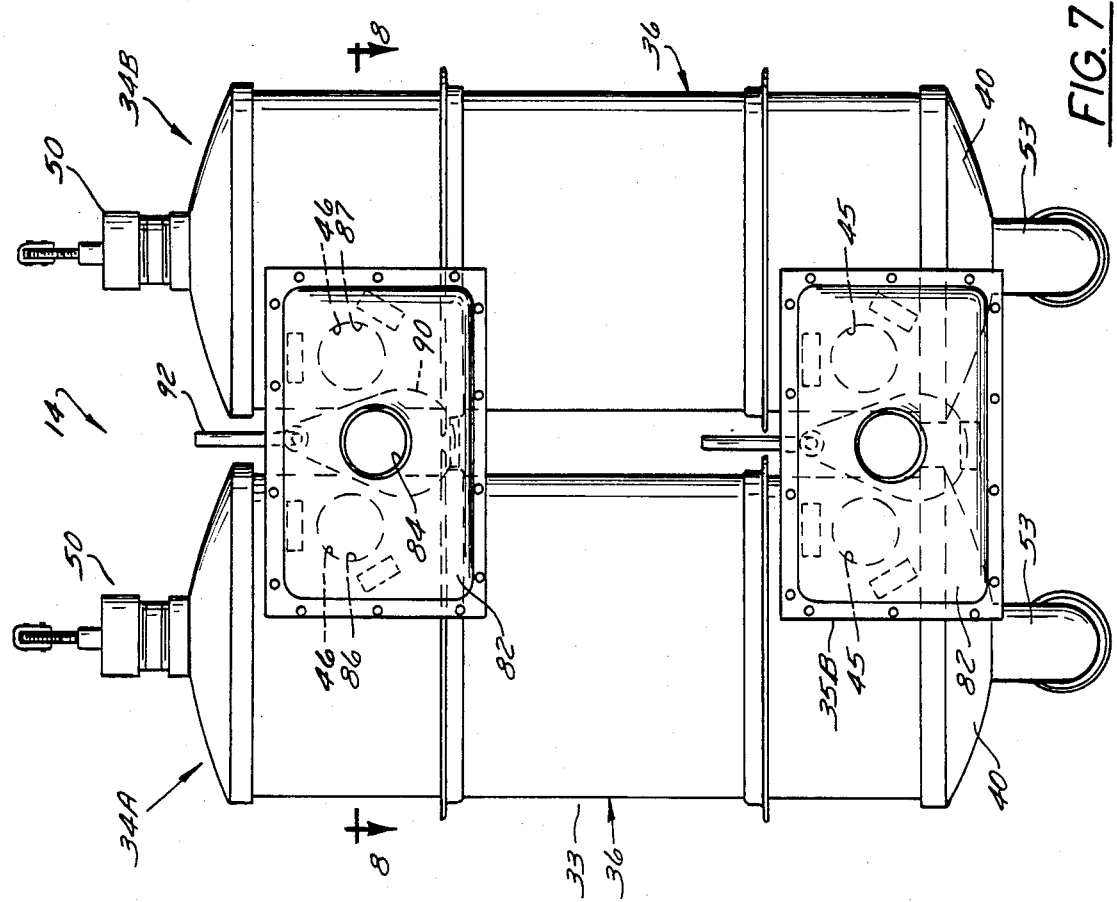

MODULAR INDUSTRIAL VACUUM LOADING APPARATUS FOR INGESTING AND COLLECTING DEBRIS AND FILTERING DISCHARGED AIR

BACKGROUND OF THE INVENTION

1. Field of Use

This invention relates generally to vacuum loader apparatus for ingesting a mixture of debris and air, for collecting the debris for subsequent disposal, and for filtering the ingested air before returning it to atmosphere.

In particular, the invention relates to improved modular portable apparatus of the aforesaid character and to improvements in interconnectable modules thereof, especially the debris loader module and the filtration module.

2. Description of the Prior Art

Vacuum loader apparatus is employed to ingest or "vacuum up" unwanted debris and to collect it in a container so that it can subsequently be disposed of. Some prior art apparatus of this type comprises a motor-driven vacuum blower which draws a mixture of debris and ambient air through a flexible hose into a collection tank wherein the debris is collected and the separated air is filtered before it is discharged to atmosphere. The collection tank usually houses either a removable, re-usable rigid container for debris or a removable, disposable, replaceable bag for debris. Prior art vacuum loader apparatus for heavy-duty industrial use is usually large, heavy and difficult for the operating personnel to move to, from and on a jobsite. In some instances, such apparatus cannot be moved to a particular jobsite where it could otherwise be advantageously employed. Furthermore, some presently-available industrial-type vacuum loaders are not well-suited to handle offensive debris, dust, powdered chemicals or other waste materials. For example, the filtered air returned to atmosphere may still contain very fine particles and be dangerous if inhaled, because of their filter-system design, construction and operation. Or, removal of the collected debris from the collection tank for final disposal, may result in undue exposure of the operating personnel to its contents, either by breathing or skin-contact, because of other design considerations.

The following prior art patents disclose the state of the art.

U.S. Pat. Nos. 3,653,190 and 3,320,727 show relatively large portable vacuum cleaners which, although they have wheels to enhance portability, are difficult or impossible to transport up and down stairs, as in schools, apartment houses and industrial plants, unless suitable elevators are available.

U.S. Pat. Nos. 4,523,936, 3,653,190 and 3,755,992 each disclose a separation chamber which employs a debris-collection bag which is maintained at the same negative pressure on its inside and outside to prevent its collapse. U.S. Pat. No. 3,740,933 shows a trash collector employing a debris-collection bag which needs a liner to maintain its shape.

U.S. Pat. Nos. 3,771,664 and 4,133,769 show relatively large filter devices.

SUMMARY OF THE INVENTION

Vacuum loading apparatus in accordance with the invention is provided for ingesting a mixture of debris and ambient air, for collecting the debris for subsequent disposal, and for filtering the ingested, separated air before discharging it to atmosphere. The apparatus comprises three relatively lightweight, portable, independently movable, interconnectable modules, each incorporating a wheeled carrier to facilitate movement of the modules to, from and on the jobsite, whereat they are interconnected for use by large flexible hoses. The power module comprises a motor-driven vacuum blower. The debris-receiver module comprises a receiver tank with a removable, disposable, replaceable, plastic debris collection bag therein and a flexible debris-collection vacuum hose externally connected thereto. A filter element is associated with the bag. The inside and outside of the flexible, non-porous plastic bag are exposed to the same negative air pressure in the receiver tank to prevent its collapse or damage during debris-loading by a pressure-equalization duct on the outside of the debris-receiver module. The two-stage air filtration module, which is connected between the vacuum blower and the receiver tank by flexible hoses, comprises two filter tanks, each having an air filter assembly therein. Valve assemblies are provided which are selectively operable to enable use of either or both filter tanks, when the apparatus operates in its loading mode, and to enable the use of one filter tank for air filtaring while the other filter tank is being purged of accumulated filtrate which is fed back to the debris-collection bag in the receiver tank through the vacuum hose, when the apparatus operates in the purge mode.

Apparatus in accordance with the invention offers numerous advantages over the prior art. For example, is is capable of heavy-duty vacuuming operations because of the high power of its electric motor and vacuum blower, the large debris-collection capacity of its collection tank, and the high-volume air-handling capacity of its filter tanks and filter assemblies. The individual modules are light-weight and relatively easy to move about, through and into otherwise-constricted and inaccessible spaces. The construction of the collection tank makes it easy, convenient and safe to gain access to, remove and replace the disposable debris-collection bag, without undue risk of exposure to offensive debris therein. The collection bag is provided with improved filter means connected thereto which confines debris and filtrate within the bag. A pressure-equalization duct connected to the collection tank on opposite sides of the filter ensures pressure equalization on the inside and outside of the bag to prevent collapse. The construction and arrangement of the filter tanks and filter assemblies therefor ensure superior filtration of a large volume of air prior to its return to atmosphere. The valve assemblies provide a self-purging capability which further enhances air filtration effectiveness and prolongs the life of the replaceable air filters. The apparatus is adaptable for use in a wide variety of environments, indoors and outside, is capable of handling particulate material ranging in size from large chunks to very fine dust, and is also capable of handling liquids and wet material. The apparatus is straightforward in design, easy and safe to use and service, resistant to physical and chemical damage and mechnical break-down, and relatively economical to fabricate.

Other objects and advantages will hereafter appear.

DESCRIPTION OF THE DRAWINGS

FIG. 7 is an elevation view of one side of the filtration module of FIG. 1 showing both of its filter tanks in closed condition and showing the exteriors of two selector valve assemblies therefor;

FIG. 8 is a cross-section view of the filter tanks and an upper valve assembly taken on line 8—8 of FIG. 1 and showing the "clean" or upper side of a filter assembly therein;

FIG. 10 is a front perspective view of a valve plate in the selector valve assembly shown in FIGS. 7 and 8.

DESCRIPTION OF PREFERRED EMBODIMENTS

Figure 1:
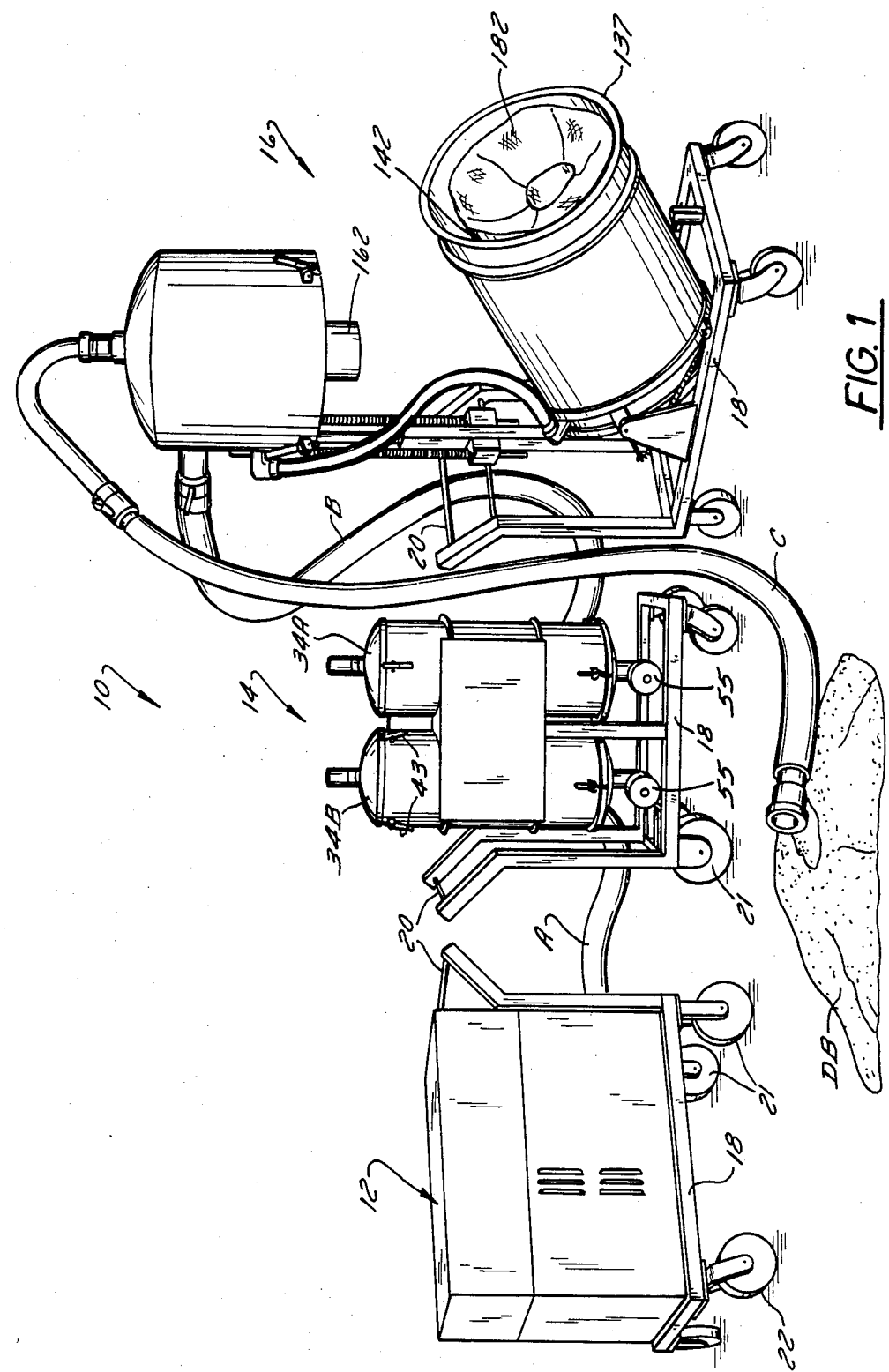
FIG. 1 is a perspective view of vacuum loader apparatus in accordance with the invention and showing a power module, a filtration module and a debris-loading module thereof interconnected by various flexible hoses.
Figure 2:
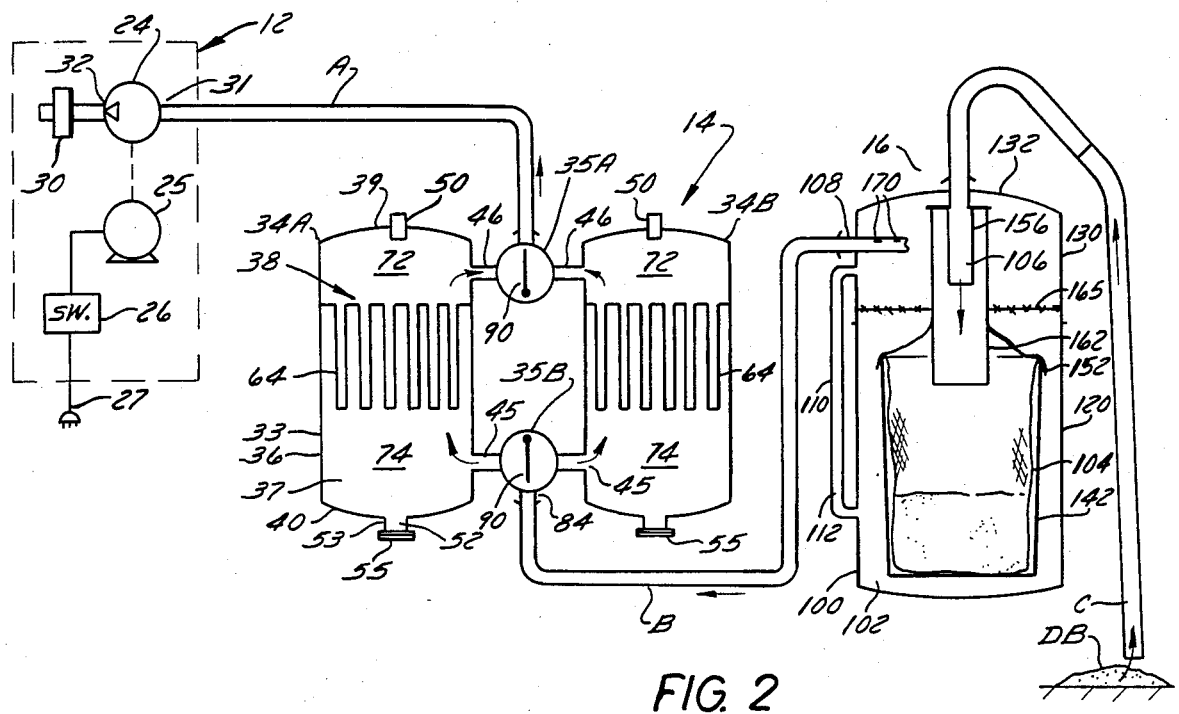
FIG. 2 is a schematic diagram of the apparatus of FIG. 1 arranged for operation in its debris-loading mode.
Figure 3:
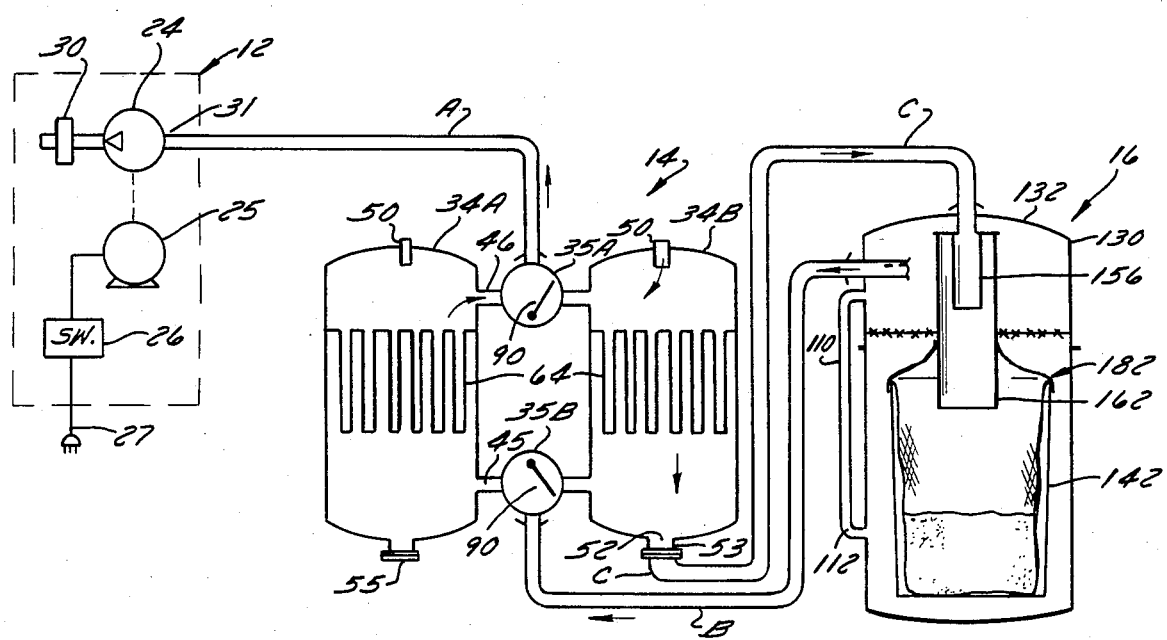
FIG. 3 is a view similar to FIG. 2 but showing the apparatus arranged for operation in its self-purging or back-flush mode wherein one of the filter tanks is being purged of collected filtrate.
Figure 4:
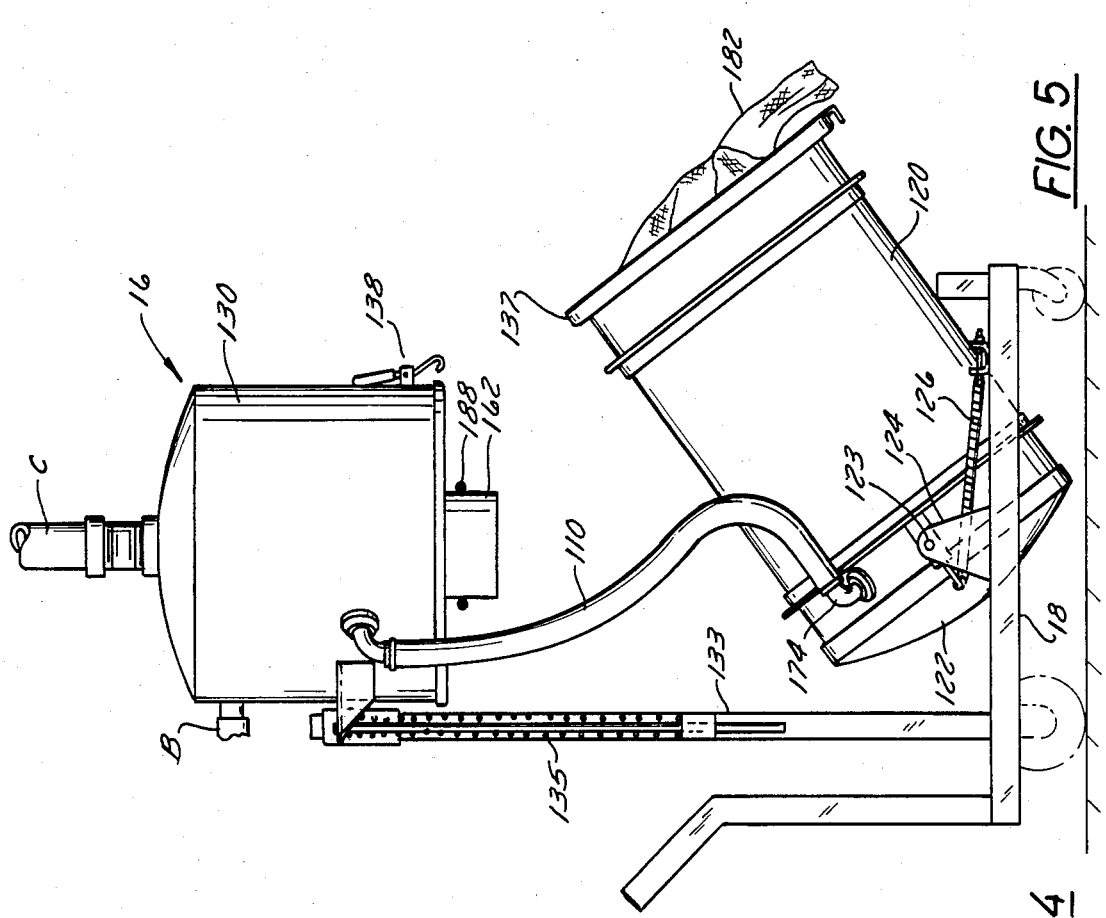
FIG. 4 is a side elevation view of the debris-loading module of FIG. 1 showing its loading tank in closed condition.

Referring to FIGS. 1, 2 and 3, numeral 10 designates vacuum loading apparatus in accordance with the invention which generally comprises a power module 12, a filtration module 14 and a debris-loading module 16. Each module 12, 14 and 16 comprises a carrier or support structure 18 formed of aluminum tubing and including a push-handle 20, a pair of lockable ground-engaging semi-pneumatic rear wheels 21 and a pair of swivel-mounted semi-pneumatic front wheels 22. Power module 12 is connected to filtration module 14 by a detachable flexible vacuum hose A. Filtration module 14 is connected to debris-loading module 16 by a detachable flexible vacuum hose B. Debris-loading module 16 is provided with a detachable debris-collection vacuum hose C.

Power Module

As FIGS. 2 and 3 show, power module 12 comprises a belt-driven vacuum blower or vacuum pump 24, an electric motor 25 for belt-driving the blower, an electric switch 26 for controlling the motor, and a line cord and plug 27 for connecting the motor to a suitable source of electric power, such as a wall-mounted electrical receptacle (not shown). Blower 24 includes a sound-reduction silencer 30 and has a suction port 31 and a discharge-to-atmosphere port 32. Blower 24 may take the form of a commerically available blower such as a GATX-Fuller positive displacement blower capable of delivering 305 cfm of air per minute at 10" Hg or 135.80" H$_2$O. Motor 25 may take the form of a Baldor squirrel cage motor rated at 7.9 Hp, 230 V., 60#2, single or 3 phase, 22 amps full-load current.

Filtration Module

Filtration module 14 comprises two identical filtration stages or units 34A and 34B and two associated identical selector or diverter valve assemblies 35A (upper) and 35B (lower). When apparatus 10 is operated in its normal debris-loading mode (FIG. 2), the diverter valve assemblies 35A and 35B are set to connect the two filtration stages 34A and 34B ln parallel with each other between power module 12 and loading module 16 so that both stages function simultaneously. However, apparatus 10 is also operable in a purging mode (FIG. 3) wherein the diverter valve assemblies 35A and 35B are set to connect either one of the filtration stages for filtration and the other to be purged, as hereinafter explained.

Referring to FIGS. 2, 7, 8 and 9, filtration stage or unit 34A (which is identical to unit 34B) comprises a filter tank 36 having a chamber 37 therein in which a filter assembly 38 is mounted. Filter tank 36, preferably made of light-weight foraminous corrosion-resistant stainless steel, comprises a hollow cylindrical body 33 and upper and lower end closures or covers 39 and 40, respectively, each detachably connected to an end of body 33 in sealed relationship by a sealing gasket 42 (FIG. 9) and a plurality of releasable latches 43 (FIG. 1). Filter tank 36 has an unfiltered air inlet port 45 near its lower end and a filtered air outlet port 46 near its upper end.

Upper end closure cover 39 is provided with an air-admission port 49 therethrough in which a manually operated normally closed valve 50 is mounted. Valve 50 (and port 49) is normally closed when appartus is not in use or is used in the loading mode, and is manually openend when tank 36 is in its purge mode to admit air from atmosphere into the upper end of tank chamber 37, as herinafter explained.

Lower end closure cover 40 is provided with a filtrate disposal port 52 defined by an elbow pipe 53 which is normally closed by a manually removable snap-on coupling type and cap 55 on the outer end of pipe 53 when apparatus 10 is not in use or is used in the loading mode. In the purge mode (FIG. 3), end cap 55 is removed so that debris-collecting vacuum hose C from debris loader module 16 can be manually connected to pipe 53 and thus to port 52, as hereinafter explained.

Figure 9:
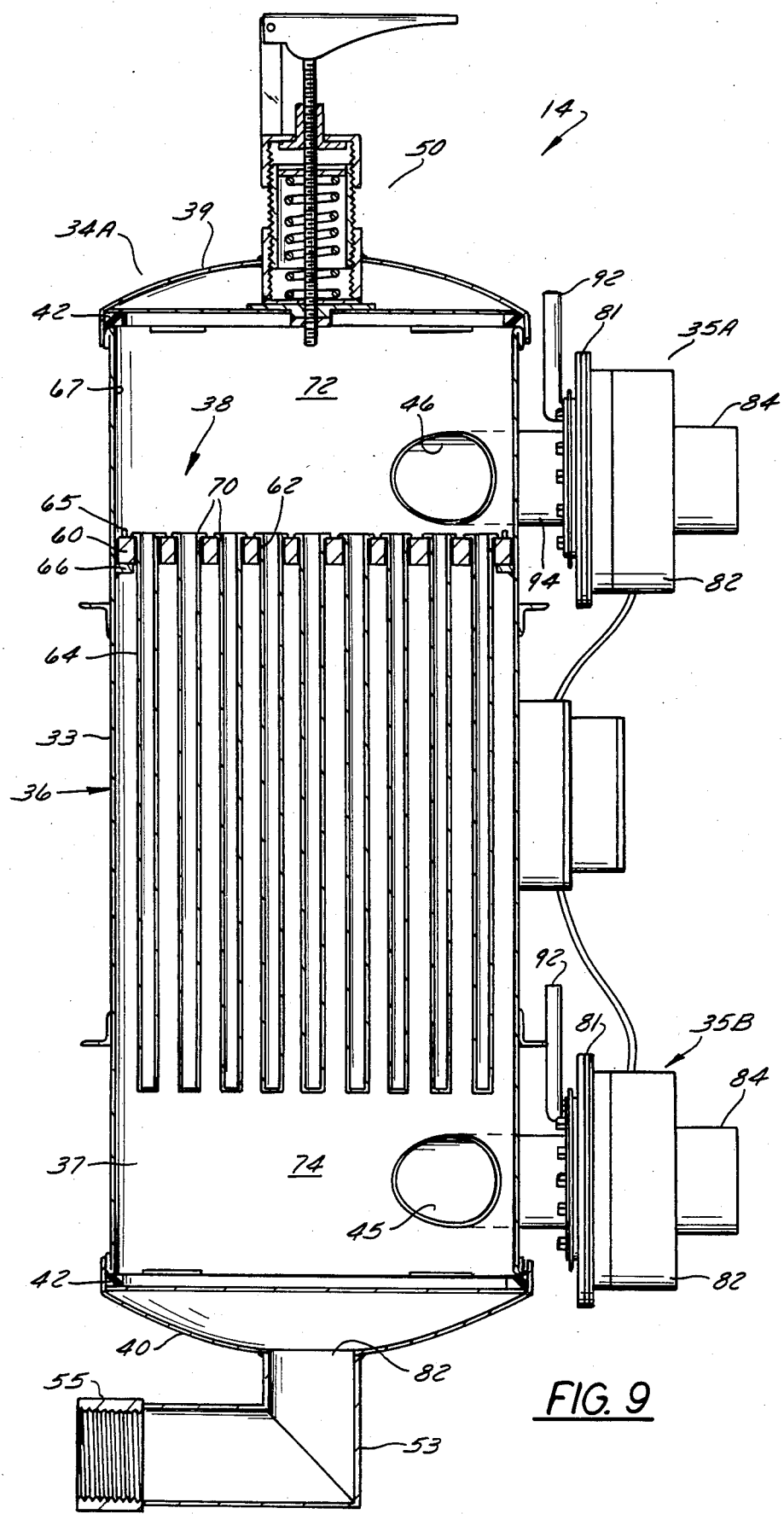
FIG. 9 is a cross-section view showing the interior of one of the filter tanks of FIG. 8.

As FIG. 9 best shows, filter assembly 38 in tank chamber 37 of filter tank 36 of unit 34A (which is identical to unit 34B) comprises a rigid plastic tube support plate 60 of circular shape and having a plurality of circular holes 62 therethrough in which a plurality or cluster of downwardly extending filter elements or tubes 64, one for each hole, are removably mounted. Support plate 60 is removably mounted in sealed relationship by four circumferentially spaced apart bolt/nut assemblies 65 to the upper side of an annular flange or shoulder 66 which is attached, as by welding, to the inside wall 67 of tank body 33 of tank 36.

Each filter tube 64 is an elongated hollow cylindrical member closed at its lower end and open at its upper end and having a flange 70 at its upper end for frictionally engaging support plate 60 in sealed relationship. Each filter tube is fabricated of thin, relatively rigid, microscopically porous plastic material, such as polyethylene. Such filter tubes are known and are commercially available from commercial sources. Unless damaged, filter replacement is unnecessary. A four to one filter ratio removes 99.5% of particulates over 3 microns in size.

Filter assembly 38, including plate 60 and the tubes 64, divide tank chamber 37 into upper ("clean") and lower ("dirty") tank chamber sections 72 and 74, respectively, and form a barrier therebetween. Dust-laden air passes from lower chamber section 72, through the tubes 64 from the outside whereat the dust (or filtrate) is trapped and retained until removed, as hereinafter explained, and filtered air enters upper chamber section 74.

Referring to FIGS. 2, 7, 8 and 10, upper diverter valve assembly 35A (identical to 35B) comprises a housing 80 formed by a flat back plate or air-distribution plate or valve plate 81 and a convex front plate 82 secured thereto in sealed relationship by bolt/nut assemblies 83 to define a valve chamber 85 therebetween. Front plate 82 is provided with a port 84. Valve plate 81 is provided with two spaced-apart valve holes 86 and 87 therethrough and with a movable (swingable) valve disc 90 which is operable by a control handle 92 which is accessible from the exterior of valve assembly 35A. A plurality of valve disc stop members 94 are provided which frictionally engage valve disc 90 to maintain it in any one of three positions into which it is movable, namely: a neutral position (shown in FIGS. 2, 7, 8 and 10) wherein both valve holes 86 and 87 are open, a position (leftward relative to FIG. 10) wherein valve hole 86 is closed and valve hole 87 is open, and another position (rightward relative to FIG. 10) wherein valve hole 86 is open and valve hole 87 is closed (see FIG. 3).

The valve holes 86 and 87 of upper diverter assembly 35A communicate through short pipes 94 and 96 (FIG. 8), respectively, with the upper filtered air outlet ports 46 of filter units 34A and 34B, respectively.

The valve holes 86 and 87 of lower diverter assembly 35B similarly communicate with the lower unfiltered air inlet ports 45 of filter units 34A and 34B, respectively.

In normal operation, as FIG. 2 shows, port 84 of upper diverter valve assembly 35A is connected by vacuum hose A to suction port 31 of blower 24 of power module 12. Port 84 of lower diverter valve assembly 35B is connected by vacuum hose B to an air outlet port 108 of a receiver tank 100 of debris-loading module 16. The diverter valve assemblies 35A and 35B are set so that both ports 46 and both ports 45 are open and the filter units 34A and 34B are connected in parallel, with both in operation. However, if preferred, only one or the other of the filter units 34A and 34B could be connected for operation, although filtration capacity would be reduced. Furthermore, as FIG. 3 shows, the valve assemblies 35A and 35B can be operated so that one filter unit (unit 34A, for example) is connected for normal operation and the other (unit 34B) is shut-off during a purging operation.

Debris-Loading Module

As FIGS. 1 through 6 show, debris-loading module 16 generally comprises a receiver tank 100 having a chamber 102 therein in which a debris-collection bag 104 is mounted and with which a debris inlet port 106 and air outlet port 108 communicate; both ports 106 and 108 being generally located near the upper end of chamber 102. A pressure equalization duct 110 having an air passage 112 therethrough is located outside tank 100 and communicates between the upper and lower ends of chamber 102. Debris inlet port 106 is adapted to be connected to the discharge end of flexible debris-collection vacuum hose C whose receiving end is adapted to be directed to ingest a mixture of air and debris designated DB in FIG. 1. Air outlet port 108 is adapted to be connected to hose B hereinbefore referred to.

Figure 5:
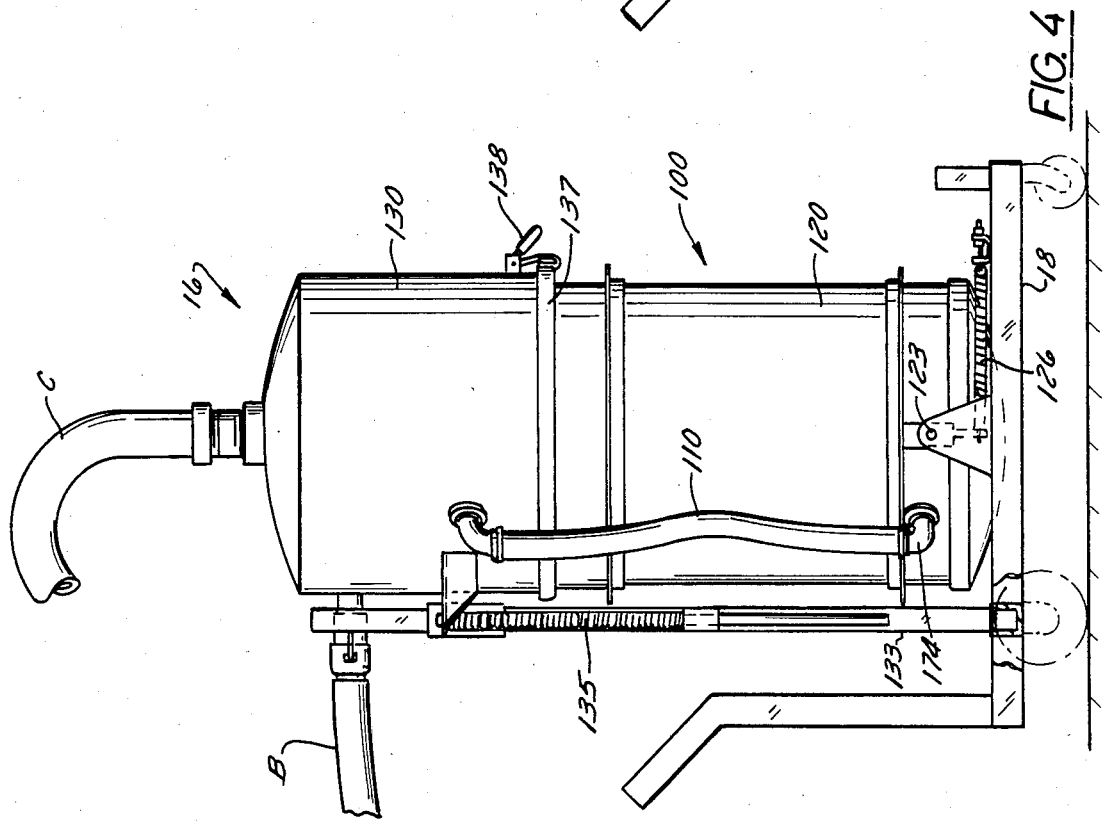
FIG. 5 is a side elevation view of the debris-loading module and showing its upper portion in open condition and its lower portion tilted.

Receiver tank 100 comprises a lower tank section 120 and an upper tank section 130. Lower tank section 120, which is open at its top end and closed at its bottom end by a lower end wall 122 (including a normally closed drain plug 125), is pivotally mounted on pivot pins 123 on a bracket 124 on support structure 18 of debris-loading module 16 to enable it to be moved manually between an upright closed position (FIGS. 4 and 6) and a tilted position (FIGS. 1 and 5) to facilitate emptying. Lower tank section 120 is dynamically balanced by a spring 126 to facilitate tilting. Upper tank section 130, which is open at its bottom end and closed at its top end by an upper end wall 132, is mounted on a slidably telescopable vertical tube and shaft assembly 133 for vertical movement relative to lower tank section 120 between a lower closed position (FIGS. 4 and 6) and an upper open position (FIGS. 1 and 5). Upper tank section 130 is dynamically balanced (with a slight upward bias toward open position) by helical springs 135 to facilitate its upward vertical movement. A plurality of releasable latches 138 are provided to engage a flange 137 on lower tank section 120 to releasably secure upper tank section 130 in closed position (FIGS. 4 and 6) wherein chamber 102 is sealed by gasket 140 shown in FIG. 7.

Figure 6:
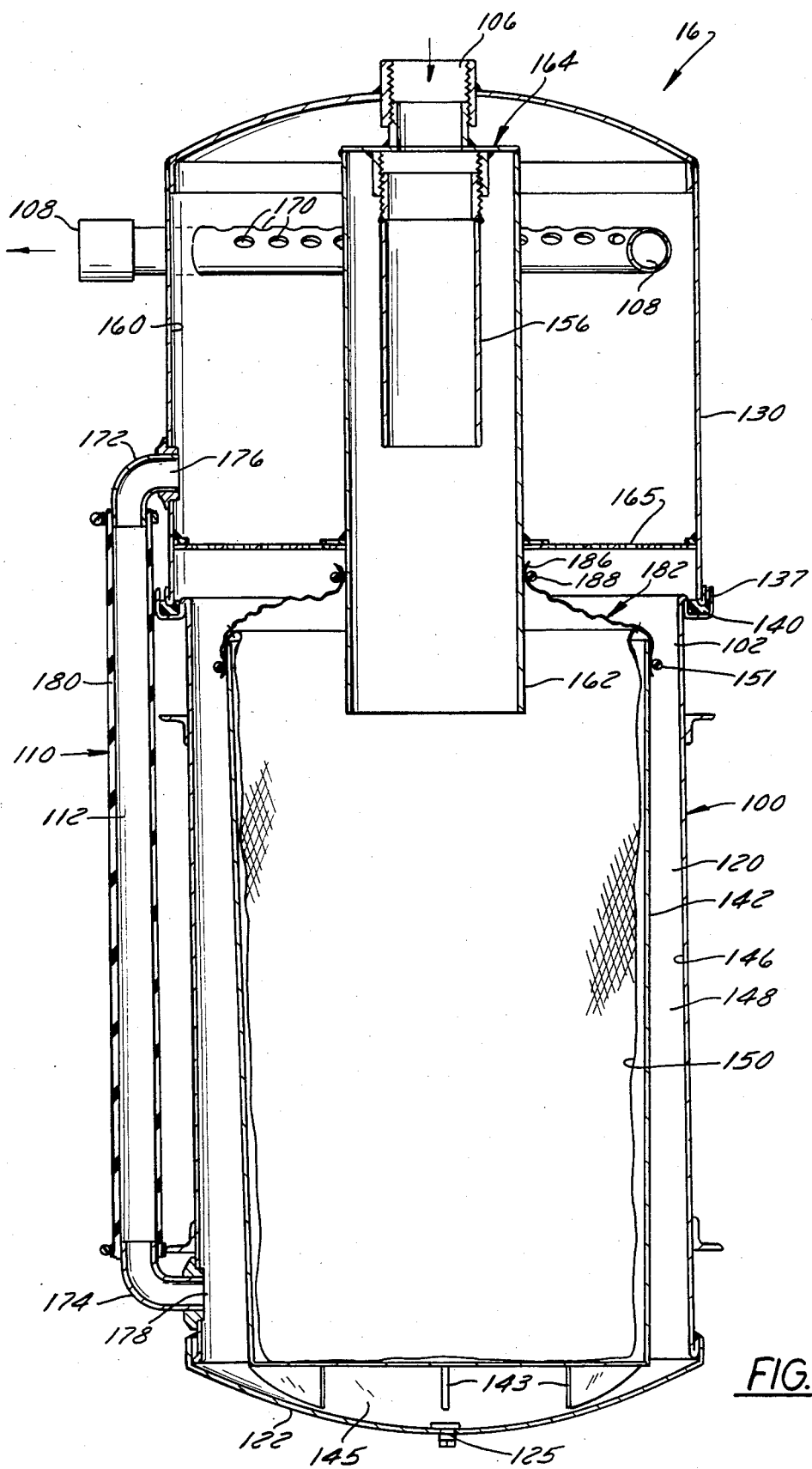
FIG. 6 is an enlarged vertical cross-section view of the debris-loading module in closed condition.

As FIG. 6 shows, lower tank section 120 is cylindrical and contains a rigid wire mesh or perforated cylindrical basket 142, open at its top end and closed (except for perforations) on its bottom end, which is concentrically and removably mounted therewithin on basket supporting legs 143. Basket 142 is separated from lower end wall 122 by a space 145 and from the side wall 146 of lower tank section 120 by a cylindrical space 148. Basket 142 receives and supports removable, flexible, imperforate, disposable, replaceable plastic bag 104 which, in FIG. 2, is shown as having an upper bag edge 151 which folds over the upper edge 152 of rigid basket 142. Another type of bag 150 is shown in FIG. 6.

Upper tank section 130 is cylindrical and supports a downwardly extending rigid refuse deposit tube 156 which is connected to debris inlet port 106 in the end wall 132 of upper tank section 130. Tube 156 is surrounded by and spaced from a concentrically disposed outer and longer tube 162 which extends downwardly into the mouth of bag 150. The tube 156 directs incoming debris into bag 104 and tube 162 operates to suppress air turbulence and aid in directing the debris into the bag. The tubes 156 and 162 are connected to each other and to tank end wall 132 by a suitable coupling assembly 164. A filter screen 165 is connected between the side wall 160 of upper tank section 130 and the outside wall of tube 162.

Upper tank section 130 also supports an air removal tube 166 which is connected at one end to air outlet port 108 in the side wall 160 of upper tank section 130. Tube 166 is semicircular in shape when viewed from above and is provided with a plurality of perforations or holes 170 therealong, preferably facing upwardly and away from bag 104 to inhibit debris disturbance and ingestion.

The pressure-equalization duct 110 comprises an upper elbow 172 and a lower elbow 174 which are connected to chamber 102 in tank 100 by duct ports 176 and 178, respectively, formed in the upper and lower tank sections 120 and 130, respectively. The elbows 172 and 174 are connected to each other by a flexible, axially extendable/retractable hose 180 which enables the upper tank section 130 to be raised and lowered and the lower tank section 120 to be tilted. Pressure-equalization duct 110 ensures that air pressure at both ends of tank 100 and inside and outside of a bag 104 or 150 is equalized to thereby prevent collapse of the bag during system operation.

In operation of debris-loading module 16, the incoming mixture of air and debris entering debris inlet port 106 descends through the tubes 156 and 162 and the debris settles by force of gravity in bag 104 or 150, whichever is used, whereas the separated air, still containing suspended particles of debris, tends to rise, pass through filter screen 165 and enter the holes 170 in air removal tube 166 for expulsion through air outlet port 108 which is at low (vacuum) pressure. Screen 165 prevents large pieces of debris from swirling up and reaching the holes 170 in tube 166. If it is desirable to pre-filter the particle-laden air and remove very fine particles before they reach the holes 170, this is accomplished by means of a filter 182 disposed between the mouth of bag 150 shown in FIG. 6 and the lower outlet end of tube 162. Filter 182 is fabricated of porous, preferably non-woven, paper cloth having a very fine mesh or porosity. Filter 182 generally takes the form of a truncated cone which has a wide lower open end 184 and a narrower upper open end 186. The upper end 186 of filter 182 slips onto the lower end of tube 162 and is held securely thereon in sealed relationship by means of a large resilient elastic flexible band 188, such as an O-ring, which can be rolled axially up or down on tube 162 when the filter is to be attached or removed. The lower end 184 of filter 182 is attached, as by sewing or gluing during bag manufacture, to the upper edge 151 of the upper open end of bag 150. The filter 182 is provided with accordian-pleats or folds intermediate its ends to allow enough slack so that the filter can reach and be installed on tube 162 when upper tank section 130 is raised to open position and bag 150 is put in place in basket 142. When tank section 130 is lowered to closed position and the system is in operation, the slack also enables the slightly lower air pressure outside the filter to cause the filter to bulge outward and upward without being damaged. When bag 150 is full of debris and is to be removed from tank 100 and disposed of, the O-ring 188 is rolled upward on tube 162 to free the upper end 186 of filter 182 (see FIG. 5) which is then slid downwardly off of tube 162 and pushed into bag 150 to which it is attached. Filtrate (comprising debris particles) which has accumulated on the "dirty" underside of filter 182, even if dislodged, falls into bag 150 (see FIG. 1). This construction provides a very clean, safe and convenient way to dispose of and replace the filter 182, and eliminates separate handling of an independently mounted filter which typically allows filtrate to be dislodged and escape back into tank 100 or elsewhere as the filter is being handled.

If desired, however, the lower end 184 of filter 182, instead of being permanently connected to bag 150 by sewing or gluing, could be made sufficiently large to enable it to slip over the edge of a bag 150 and around the open end of basket 142 and could be held in place thereon by a larger elastic band (not shown) disposed around the outside of basket 142 and axially movable thereon in the same manner as O-ring 188. However, this alternative construction is not as advantageous, efficient or clean as the preferred construction and arrangement of filter 182 described hereinbefore, although it would be advantageous in situations where it is desired to retain and re-use one filter with several bags, if the nature of the debris permits this.

Operation

FIG. 2 shows the apparatus connected for a vacuuming operation wherein both filter units are connected in parallel and both effect filtration. Assume that motor 25 and vacuum blower 24 are in operation. A mixture of air and debris is ingested through hose C and enters chamber 102 of receiver tank 100 through port 106 and tubes 156 and 162. When bag 150 (instead of bag 104 of FIG. 2) is used, the debris falls into bag 150, debris-lade air passes through upwardly filter 182 where it is pre-filtered, through screen 165, and the pre-filtered air passes through ports 170 of air removal tube 166, through air outlet port 108, through hose B, and through the lower diverter valve assembly 35B to both filtration units 34A and 34B. Pre-filtered air enters the lower air inlet port 45 at the bottom of each unit 34A and 34B, passes through the filter tubes 64 in the filter tanks 36 wherein it is filtered, and exits as filtered air through the outlet port 46 at the top of each unit 34A and 34B, through the associated valve holes 86 and 87 in upper diverter valve assembly 35A, through its port 84, through hose A, and through vacuum blower 24 wherefrom it is expelled to atmosphere. This cycle of operation is continuous as long as the system is in operation and the valve discs 90 of the diverter valve assemblies 35A and 35B are in neutral (FIG. 10) position.

One or the other of filtration units 34A and 34B may be bypassed during system operation, if some situation so requires, and this is accomplished by moving the valve discs 90 in both the upper and lower diverter valve assemblies 35A and 35B so as to close the appropriate valve holes 86 or 87 therein.

FIG. 3 shows the apparatus connected for self-purging operation. In this operation, the diverter valve assemblies 35A and 35B are operated so that one filtration unit 34A or 34B is connected for normal filtration and the other unit is connected to be purged. In FIG. 3, for example, unit 34A is connected to filter and unit 34B is connected to be purged, but it is to be understood that the situation could be reversed To achieve the purge mode shown in FIG. 3, the valve discs 90 in both the upper and lower diverter valve assemblies 35A and 35B are manually moved to close the upper and lower valve holes 87. Furthermore, the valve 50 on filtration unit 34B is manually operated to open air admission port 49 on filter tank 36 of unit 34B. Also, the free suction end of debris-collection hose C is connected to filtrate disposal port 52 at the bottom of filter tank 36 of unit 34B after its closure cover 55 is manually removed.

In this mode, when motor 25 and vacuum blower 24 are in operation, the flow path is as follows. Atmospheric air is drawn through admission port 49 of unit 34B and is drawn in the reverse direction through the filter tubes 64 therein and is expelled through filtrate disposal port 52 and into vacuum hose C. In the process, accumulated filtrate in the bottom of filter tank 36 of unit 34B, as well as filtrate which has accumulated on the dirty side of the filter tubes 64, is also drawn into vacuum hose C. This mixture of air and debris (i.e., accumulated filtrate) is cycled through receiver tank 100 of the debris-loader module 16 in the same manner as hereinbefore described and the separated air is then filtered in filtration unit 34A and expelled to atmosphere from vacuum blower 24 in the same manner as hereinbefore described. When filtration unit 35B is completely purged, the system operator may connect the system to similarly purge filtration unit 35A (if so required) and then may re-connect the system for normal vacuuming operation, as hereinbefore described.

As FIG. 1 shows, the three modules 12, 14 and 16 are interconnected for normal operation solely by means of the two flexible detachable hoses A and B and hose C is used for debris-collection or purging as explained above. Thus, each module 12, 14 and 16 is independently movable to, from and on a jobsite and each is of such a size and weight to enable one person to roll it and to enable one or two persons to move it up or downstairs.

When the bag 150 is filled with debris, one person can easily open and lift upper tank section 130, effect detachment of filter 182 from the upper section and stuff it into the bag, and tilt lower tank section 120 to facilitate removal of the bag for subsequent disposal. As is apparent from the previous description, if bag 150 is used, a human operator has minimum or virtually no exposure to debris and filtrates when purging the system or removing and replacing the bag 150. However, safety precautions in the form of proper clothing and breathing apparatus should still be utilized, if required or if advisable.

I claim:

1. Vacuum loader apparatus for ingesting a mixture of particulate material and air, for depositing a major portion of said material in a container, and for filtering air separated from said mixture to remove suspended residual material therefrom and trap it as disposable filtrate prior to discharging the separated air to atmosphere, said apparatus comprising:
   a power module comprising a motor-driven vacuum blower;
   a filtration module comprising a plurality of filter tanks;
   a debris-loading module comprising a tank having a debris-collection container therein;
   each of said modules being independently movable;
   each filtration tank having filter means therein;
   valve means selectively operable to connect said plurality of tanks for filtering operation and, alternately, to connect at least one of said tanks for filtering operation and others of said tanks for purging;
   a first detechable fluid conduit connectable between said vacuum blower of said power module and said filtration module;
   a second detachable fluid conduit connectable between said filtration module and said debris-loading module;
   a third conduit having one end connected to said debris-loading module and having an opposite end for ingesting a mixture of debris and air and means for connecting a tank selected for purging to said opposite end of said third conduit.

2. Vacuum loader apparatus according to claim 1 whererin said power module comprises a motor-driven vacuum blower, wherein said filtration module comprises at least one filter tank having filter means therein, and wherein said debris-loading module comprises a tank having a removable debris-collection container therein.

3. vacuum loader apparatus according to claim 1 wherein each of said modules comprise a supporting framework having wheels thereon.

4. Vacuum loader apparatus according to claim 3 wherein said fluid conduits comprise flexible hoses.

5. Vacuum loader apparatus according to claim 2 wherein said filtration module comprises a plurality of filtration tanks, each filtration tank having filter means thereon;
   valve means selectivel operable to connect said plurality of tanks for filtering operation and, alternately, to connect at least one of said tanks for filtering operation and others of said tanks for purging;
   and means for connecting the tanks selected for purging to said third conduit on said debris-loading module.

6. Vacuum loader apparatus for ingesting a mixture of partculate material and air, for depositing a major portion of said material in a disposable container, and for filterirg air separated from said mixture to remove suspended residual material therefrom and trap it as disposable filtrate prior to discharging the separated air to atmosphere, said apparatus comprising:
   a vacuum blower;
   at least two filtration units connectable to be operated by said vacuum blower, each unit comprising a tank and filter means in said tank;
   and means for directing a mixture of debris and air being propelled by said blower through both tanks in a direction to effert filtering thereof and collection of filtrate in each tank;
   and for directing air being propelled by said vacuum blower in a reverse direction through one of said tanks to expel a mixture of air and collected filtrate from said one tank and for directing said mixture of air and colllected filtrate being propelled by said vacuum through the other of said tanks to effect filtering thereof.

7. Vacuum loader apparatus for ingesting a mixture of particulate material and air, for depositing a major portion of said material in a disposable imperforate bag, and for filtering air separated from said mixture to remove suspended residual material therefrom air trap it as disposable filtrate prior to discharging the separated air to atmosphere, said apparatus comprising:
   first means comprising a motor-drive vacuum blower having a suction port and an air discharge port communicating with atmosphere;
   second means comprising a plurality of filtrate tanks, each filtrate tank having a filter tank chamber therein and containing filter means for trapping filtrate and dividing said filter tank chamber into a clean side connectable to said suction port of said first means and a dirty side;
   third means comprising a debris-collection tank having a debris-collectlon chamber therein defined by the tank wall and having upper and lower ends which are in direct communication with each other, said chamber containing said bag for receiving said major portion of ingested particulate material, said bag having an inside and an outside which is spaced away from said tank wall and an open upper end said debris-collection tank having an air port connectable to said dirty side of said filter tank chamber of said second means,
   said debris-collection tank having a mixture inlet port communicating with said debris-collection chamber and disposed with respect to said open upper end of said bag so as to enable said major portion of said material from said mixture ingested through said mixture inlet to be deposited in said bag and to enable unfiltered ingestd air to be directed through said air port to said dirty side of said filter tank chamber;

and selectively operable valve means for connecting any combination of said filter tanks between said suction port of said first means and said air port of said third means to effect filtration.

8. Vacuum loader apparatus according to claim 7 wherein said second means comprises a plurality of filter tanks, each filter tank containing filter means, and selectively operable valve means for connecting any combination of said filter tanks between said suction port of said first means and said air port of said third means to effect filtration.

9. Vacuum loader apparatus according to claim 7 wherein said selectively operable valve means are further operable to connect the dirty side of at least one of said filter tanks to said mixture inlet port of said filter tank chamber and to connect the clean side of said one filter tank to atmosphere to effect purging of said one filter tank, and to connect said air port of said debris-collection tank to said dirty side of another of said filter tank chambers.

10. Vacuum loader apparatus according to claim 7 or 9 wherein said debris-collection tank is provided with an air passage communicating between said upper and lower ends of said debris-collection chamber to equalize air pressure therebetween.

11. An air filtration module for vacuum loader apparatus which comprises a vacuum blower, said air filtration module comprising:

a pair of filter tanks each having a filter tank chamber therein;

filter menas in each filter tank and dividing said filter tank chamber into a clean side and a dirty side;

first and second ports in each tank communicating with said clean and dirty sides, respectively, said first port on each tank being connectable to said vacuum blower;

an air inlet port in each tank communicating between said clean side and atmosphere;

valve means on each tank operable to open and close said air inlet port therein;

first valve means for selectively directing unfiltered air into either or both or neither of said second ports of said tank;

second valve means for selectively directing filtered air from either or both or neither of said first ports of said tanks;

a filtrate outlet port in each tank communicating with said dirty side of the tank chamber to remove filtrate therefrom;

and means to selectively open and close said filtrate outlet port.

12. An air filtration module according to claim 11 wherein each of said first and second valve means comprises:

a plate having a pair of ports therethrough;

a housing secured to said plate in sealed relationship and cooperating therewith to define a housing chamber which communicates with said pair of ports;

said housing having a housing port therethrough which communicates with said housing chamber;

and means operable from the exterior of each of said valve means to selectively open or close alternately each port of said pair of ports.

13. An air filtration module according to claim 12 wherein said means operable to selectively open or close each port comprises a valve disc movably mounted on said plate, and means to move said valve disc between positions wherein it closes either one or neither of said pair of ports.

14. A debris-loading module for vacuum loader apparatus comprising:

a debris-collecting tank having a debris-collection chamber therein defined by the wall of said tank, said chamber having an upper end and a lower end which are in direct communication with each other within said tank, said tank comprising an upper tank section, an axially aligned lower tank section;

means for supporting said tank sections so that at least one of said sections is axially movable relative to the other of said sections between closed and open position;

means to releasably secure said tank sections in closed position in sealed relationship to one another;

means for supporting said lower tank section so that it can be tiltably moved out of axial alignment with said upper tank section to facilitate access to the interior of said lower tank section the said one tank section is moved to open position;

inlet port means at the upper end of said chamber for admitting a mixture of particulate matter and air;

means for supporting an imperforate debris-collection removable receptacle in the lower end of said chamber below said inlet port and spaced from air wall of said tank;

and outlet port means at the upper end of chabmer for expelling air separated from said mixture, said inlet port means including a first tube projecting axially downwardly toward said means for supporting said debris-collection receptacle, and said output port means including a perforated tube disposed around said first tube.

15. A debris-loading module according to claim 14 further comprising means defining an air passage connected between the upper end of said chamber and near said outlet port and the lower and of said chamber adjacent the lower end of said receptacle comprising flexible means which allow said tank sections to move relative to one another and operable when said tank sections are open to trap and convey errant debris in said lower tank section and transmit it to said outlet port means.

16. Debris-collection and filtering means for use in a debris-collection tank (100) having a debris-collection chamber (102) in which are disposed a container support in the form of a rigid basket (142) having an upper edge (152) and a debris-iulet tube (162) located above said support, said means comprising:

a removable, flexible inperforate, disposable, replaceable bag (104, 150) open at the top and having an upper bag edge (151) which folds over said upper edge (152) of said rigid basket (142) edge;

a flexible cone-shaped filter (182) having an open upper end (186) and an open lower end (184), said lowe end (184) having an outer circumferential edge and said upper end (186) having an opening therethrough for accommodating said debris-inlet tube (162) so that said filter (182) can be releasably secured to the exterior of said tube in sealed relationship;

and attachment means for permanently securing said outer circumferential edge of said filter (182) to said upper bag edge (151) of said bag (104, 150).

17. Debris-collection and filtering means according to claim 16 wherein said attachment means comprises adhesive.

18. Debris-collection and filtering means according to claim 16 wherein said attachment means comprises stitching 19. Debris-collection and filtering means according to claim 16 or 17 or 18 further comprising an endless flexible elastic member (188) for releasably securing said upper end (186) of said flexible filter (182) to said tube (162) in sealed relationship.

20. An air filtration module for vacuum loader apparatus comprising:
   a pair of filter tanks each having tank chamber therein;
   filter means in each filter tank and dividing said filter tank chamber into a clean side and a dirty side;
   first and second ports in each tank communicating with said clean and dirty sides, respectively:
   an air inlet port in each tank communicating between said clean side and atmosphere;
   valve means on each tank operable to open and close said air inlet port thereof;
   first valve means for selectively directing unfiltered air into either or both or neither of said second ports of said tank;
   second valve means for selectively directing filtered air from either or both or neither of said first ports of said tanks;
   a filtrate outlet port in each tank communicating with said dirty side of the tank chamber to remove filtrate therefrom;
   and means to selectively open and close said filtrate outlet port,
   each of aid first and second valve means for selectively directing unfiltered and filtered air, respectively, comprising:
   a plate having a pair of ports therethrough;
   a housing secured to said plate in sealed relationship and cooperating therewith to define a housing chamber which communicates with said pair of ports;
   said housing having a housing port therethrough which communicates with said housing chamber;
   and means operable from the exterior of each of said first and second valve means to selectively open or close alternately each port of said pair of ports.

21. An air filtration module according to claim 20 wherein said means operable to selectively open or close each port comprises a valve disc movably mounted on said plate, and means to move said valve disc between positioned wherein it closes either one or neither of said pair of ports.

* * * * *